Oct. 22, 1935.  N. K. ENGST ET AL  2,018,399
GAUGING APPARATUS
Filed March 11, 1932      3 Sheets-Sheet 3
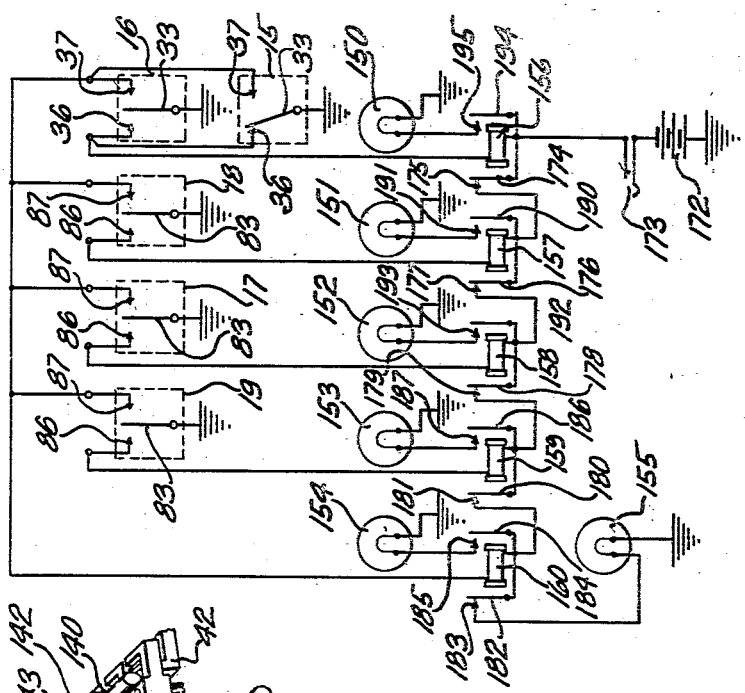
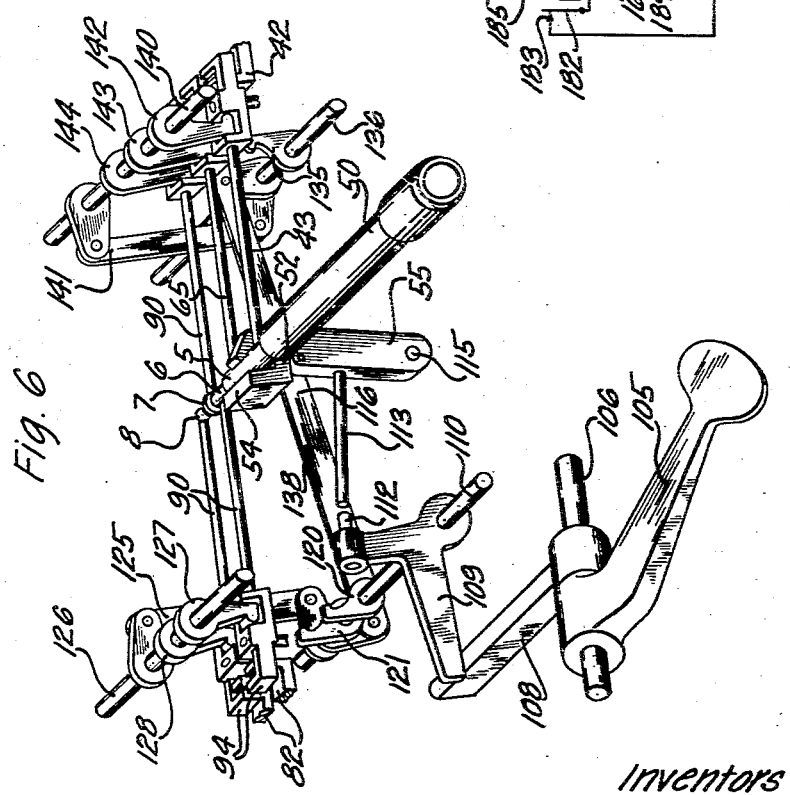
Inventors
N. K. Engst
A. W. Schoof
By H. A. Whitehorn Atty.

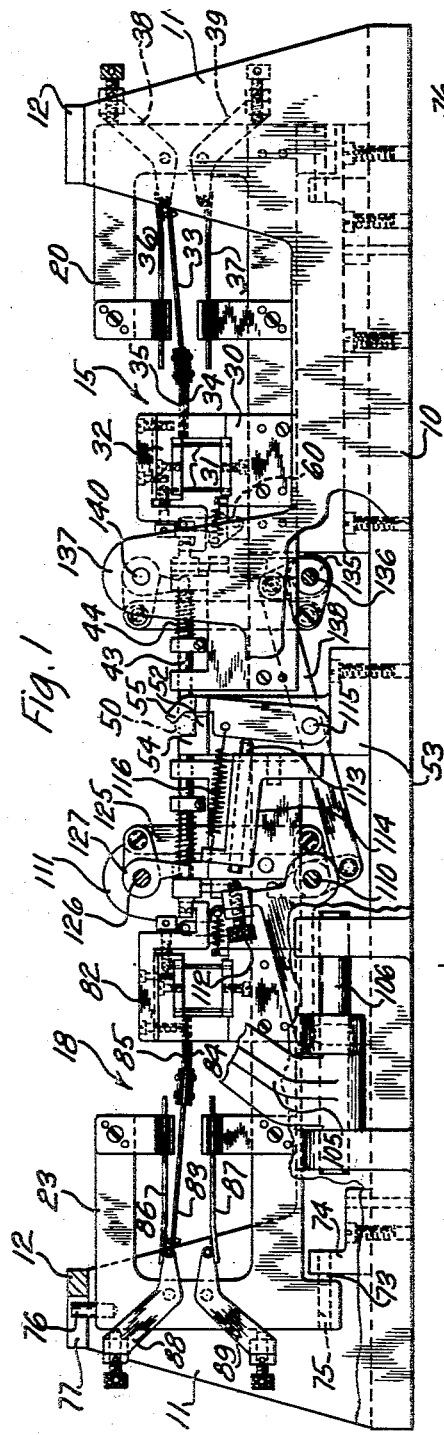

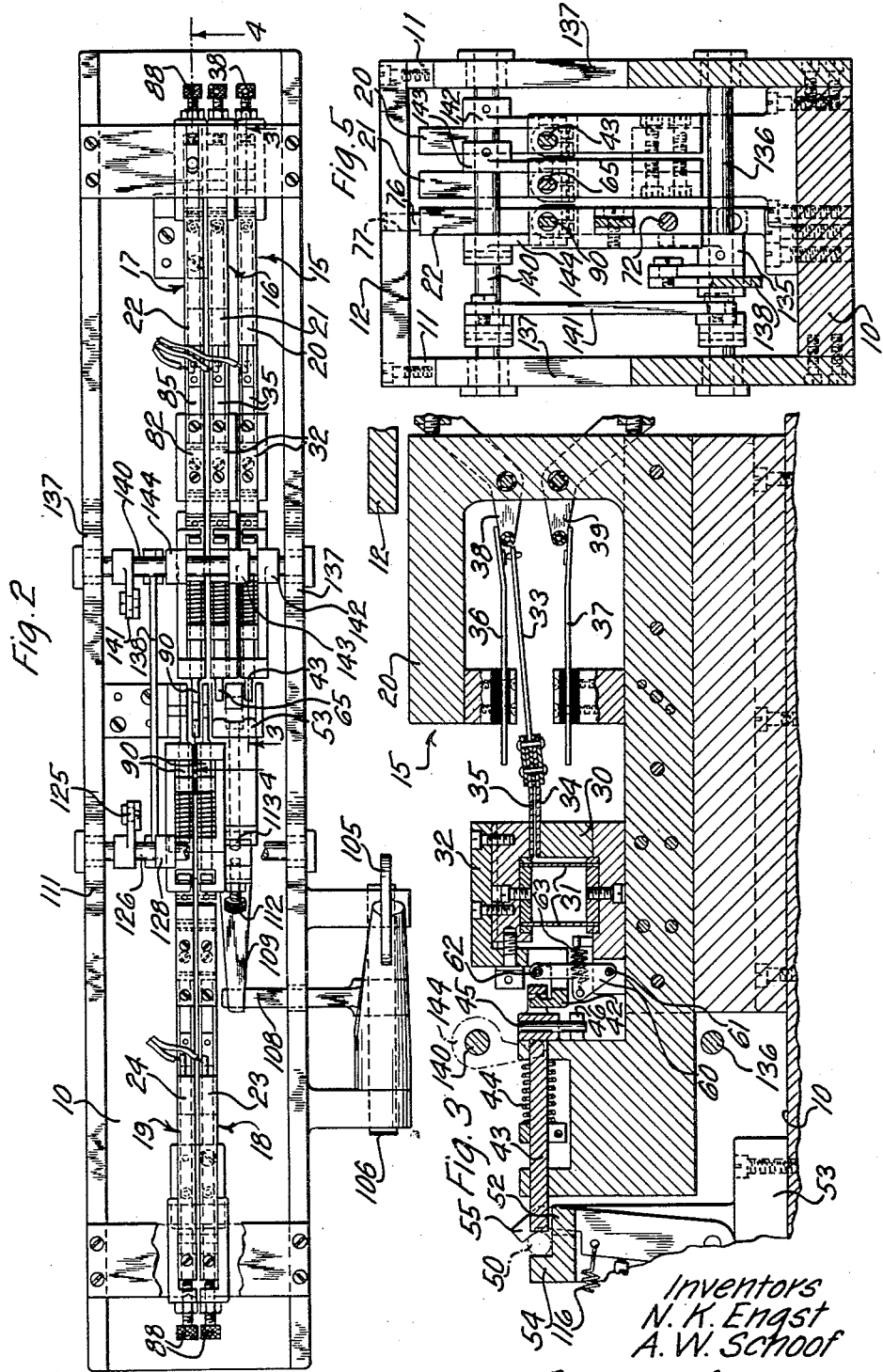

Patented Oct. 22, 1935

2,018,399

UNITED STATES PATENT OFFICE 2,018,399

GAUGING APPARATUS

Norbert K. Engst, La Grange Park, and Arthur W. Schoof, Riverside, Ill., assignors to Western Electric Company, Incorporated, New York, N. Y., a corporation of New York Application March 11, 1932, Serial No. 598,206

23 Claims. (Cl. 177—351)

This invention relates to gauging apparatus and its object is to provide a simple, efficient, and highly accurate apparatus for gauging a plurality of portions or dimensions of an article and for indicating the results of the gauging operation.

In accordance with one embodiment, the invention contemplates an apparatus for gauging a plurality of portions of an article simultaneously, comprising a plurality of relatively movable work engaging elements arranged to engage separate portions of an article to be gauged, and circuit controlling members responsive to the relative movements of the work engaging elements. The circuit controlling members selectively control a chain of relays which, in turn selectively control a plurality of indicating devices or signaling lamps for indicating whether or not all of the gauged portions of an article are within predetermined limits, the indicating device also serving to indicate a predetermined one of the defective portions, if more than one of the gauged portions are defective.

Other features and advantages of the invention will become apparent from the following detailed description, reference being made to the accompanying drawings, wherein Fig. 1 is a side elevational view of the gauging apparatus, portions thereof being broken away;

Fig. 2 is a top plan view of the apparatus;

Figs. 3 and 4 are enlarged sectional views taken along lines 3—3 and 4—4, respectively, of Fig. 2;

Fig. 5 is a vertical sectional view taken along the line 5—5 of Fig. 4;

Fig. 6 is a perspective view of the lever controlled mechanism for moving the gauging plungers, the movable frames and the clamp; and Fig. 7 is a wiring diagram of the electrical signaling system associated with the gauging apparatus.

The apparatus illustrated in the drawings and hereinafter described in detail is particularly adapted for gauging terminal plugs of the type commonly used in telephone circuits. Plugs of this type, as shown in Fig. 6, are composed of a plurality of portions hereinafter referred to as the sleeve 5, the ring 6, the dead collar 7, and the tip 8. It is essential that the dimensions of these portions are within certain predetermined limits in order to insure the proper functioning of the plug in a companion jack.

Referring now to the drawings, wherein like reference numerals designate similar parts throughout the several views, numeral 10 designates a horizontal base portion of a suitable support having vertically extending portions 11 at each end thereof connected at their upper extremities by horizontally disposed members 12. The base portion 10 has mounted thereupon a plurality of gauging units, indicated generally at 15, 16, 17, 18 and 19, arranged to simultaneously gauge the tip, dead collar, ring and sleeve of a plug. The gauging units 15 and 16 serve to gauge spaced portions of the sleeve, while the gauging units 17, 18 and 19 serve to gauge the dead collar, ring and tip, respectively. The gauging units 15 and 16 have frames 20 and 21, respectively, which are rigidly secured to the base portion 10 by any suitable means, such as screws shown in Figs. 1 and 3 while the gauging units 17, 18 and 19 have movable or floating frames 22, 23 and 24, respectively.

The gauging units 15 and 16 are identical in construction and a description of one will apply equally well to them both. Upon considering the construction of the gauging unit 15, which will now be described, attention is directed to Figs. 1 and 3, which illustrate the frame 20 as having a stationary member 30 fixed thereto and constructed so as to firmly hold the lower ends of parallel reeds or springs 31. The reeds 31 are fixed at their upper ends to a movable member 32 connecting it to the stationary member 30. A circuit controlling member 33 is operatively connected, at one end, to the stationary member 30 and the movable member 32 by flat springs 34 and 35, respectively, which connection brings about an upward movement of the free end of the circuit controlling member 33, when the movable member 32 is moved to the left, and a downward movement thereof when the movable member is moved to the right. The circuit controlling member 33 is arranged to engage resilient contacts 36 and 37 carried by the frame 20, but insulated therefrom. The relative positions of the free ends of the contacts 36 and 37 may be varied by adjustable pivoted abutting elements indicated at 38 and 39, respectively.

The portion of the movable member 32 at the left has somewhat of a U-shaped formation, an upwardly extending portion 42 of which engages a projection of a gauging plunger 43, which is normally urged to the left by a spring 44, disposed concentric therewith, and guided in its movement, for the purpose of preventing possible rotation thereof, by a guide pin 45 movably disposed in a slot 46. The gauging plunger 43 is slidably journaled in spaced vertical projections of the frame 20 and has its article engaging end positioned to engage one portion of the sleeve 5 of a plug being gauged. When the plug is placed in the apparatus for the purpose of being gauged, the sleeve 5 thereof, shown more clearly in Fig. 6, rests upon a horizontal portion 52 of a supporting bracket 53 and is held against an abutting shoulder or vertically extending portion 54 of the supporting bracket by a clamp 55.

The spring 44 normally urges the gauging plunger 43 in one direction, for example, to the left, as shown in Figs. 1 and 3, urging the movable member 32 to the left and causing an upward movement of the circuit controlling member 33. A biasing member 60 in the form of a lever is pivotally mounted upon the stationary member 30 at 61 and carries a pin or projection 62 at the upper end thereof, which is positioned in engagement with the movable member 32. The biasing member 60 is urged about its pivot in a clockwise direction (Fig. 3) by a spring 63, which has sufficient energy to move the movable member 32 to the right and cause a downward movement of the circuit controlling member 33 to move it into engagement with the contact 37, when the gauging plunger 43 is moved a sufficient distance to the right against the tension of the spring 44.

The gauging unit 16 has a gauging plunger 65 and the mechanism associated therewith is identical in construction to that just described as constituting the gauging unit 15. The gauging unit 16 is arranged to gauge the portion of sleeve 5 which extends from one side of the clamp 55, while the gauging unit 15 is arranged to gauge the portion of the sleeve which extends from the opposite side of the clamp 55.

The gauging units 17, 18 and 19 are termed movable gauging units in view of the fact that the frames thereof, as well as the gauging plungers, are movable. These gauging units are identical in construction, even though one of them is positioned parallel with and adjacent to the gauging units 15 and 16 and the other two are disposed upon the opposite side of the base portion 10, and a description of one will apply equally well to all of them.

For the purpose of illustration, an enlarged detailed view has been shown in Fig. 4 of the gauging unit 17, the frame 22 of which has an aperture 71 in the left end thereof for receiving a supporting pin 72 for providing means whereby the frame may be movably supported at this portion. Another means for movably supporting the frame 22 is shown at the lower right-hand corner thereof and consists of a supporting pin 73 fixedly mounted in a bracket 74 and extending laterally therefrom and receivable in an aperture 75 in the frame 22, the aperture being sufficiently large to permit movement of the frame freely relative to a supporting pin 74 yet not permit transverse movement thereof.

A guiding means, as shown in the upper right-hand corner of the frame 22, consists of a guiding pin 76 carried by the frame and movably receivable in a slot 77 of the horizontal connecting member 12. Mounted upon the frame 22 is a stationary member 80 to which is fixed the lower ends of parallel supporting reeds or springs 81, the upper ends of the springs being fixed to a movable member 82 which is connected to the stationary member 80 through the springs 81. A circuit controlling member 83 is operatively connected, at one end, to the stationary member 80 and the movable member 82 by flat springs 84 and 85, respectively, the opposite end of the circuit controlling member 83 being arranged to engage resilient contacts 86 and 87 carried by the frame 22, but insulated therefrom. The free ends of the resilient contacts 86 and 87 are adjustable relative to each other by pivoted abutting elements 88 and 89, respectively.

A gauging plunger 90 is slidably journaled in spaced vertical projections of the frame 22 and is normally urged toward the work by a spring 91 disposed concentric therewith. A pin 92 carried by the gauging plunger 90 has its lower projecting end receivable in a slot 93 of the frame 22 for holding the gauging plunger against rotation. The end of the gauging plunger opposite the article engaging end is operatively connected to the movable member 82, as at 94, which connection causes the movement to the left of the movable member 82 and an upward movement of the circuit controlling member 83 by means of the spring 91 during movement of the gauging plunger toward the left (Fig. 4).

When the dead collar 7 of the plug being gauged is larger than the standard requirement and the gauging plunger 90 is moved to the right a greater distance than is necessary to normally position the movable member 82, so that the springs 81 will extend vertically and the springs 84 and 85 will be in their normal positions, a biasing member 95, which is pivotally mounted at 96 upon the stationary member 80, is urged in a clockwise direction about its pivot by a spring 97 to cause a pin or projection 98, carried by the upper end thereof, to engage the movable member 82 and move it the full extent of the distance allowed by the gauging plunger 90. An adjustable abutting member 102 of the frame 22 extends upwardly and has an engaging surface 103 which engages the dead collar 7 at a point diametrically opposite the point of engagement of the gauging plunger 90. In Fig. 4 there is shown a fragmentary portion of the frame 22 of the gauging unit 19, together with the supporting pin 72 and the gauging plunger 90 thereof.

When a plug to be gauged is placed in the apparatus, it rests upon the horizontal portion 52 of the bracket 53 and is firmly held in this position against the vertical portion 54 of the same bracket by the clamp 55. Furthermore, the gauging plungers of all of the gauging units are forced into intimate engagement with the respective portions of the plug and in regard to the gauging units 17, 18 and 19, the springs 91 not only force the gauging plungers 90 into intimate engagement with the respective portions of the plug but also force the engaging surfaces 103 of the adjustable abutting members 102 of the respective frames 22, 23 and 24 into intimate engagement with the respective portions of the plug at points diametrically opposite the respective gauging plungers.

In order to condition the apparatus so that a plug may be disposed therein for gauging, means is provided for moving the clamp 55 away from the horizontal portion 52 and the vertical portion 54 of the bracket 53. The gauging plungers of all of the gauging units are moved away from the position assumed by the article and the frames of the gauging units 17, 18 and 19 are moved in directions opposite the movement imparted to their respective gauging plungers. The mechanism for accomplishing this result is shown in skeleton form in Fig. 6.

This mechanism consists of a lever 105 fixed to a shaft 106 which is journaled in bearings 107 integral with the supporting base 10. Fixedly mounted upon the shaft 106 adjacent the hand lever 105 is a lifting arm 108 having a rounded upper surface disposed in engagement with a rocking lever 109, as shown in Figs. 2 and 6. The rocking lever 109 is fixedly mounted upon a shaft 110, the ends of which are journaled in bearings disposed in vertically extending portions 111 of the supporting base 10. The rocking lever 109 has an adjustable screw 112 (Figs. 1 and 6) disposed in an upwardly extending projection thereof and positioned to engage one end of a push rod 113 which is slidably disposed in a bracket 114, the other end of the push rod being disposed in engagement with the clamp 55 and arranged to move the clamp in a clockwise direction about the pivot 115 against the tension of a spring 116 to move the clamp away from the supporting surfaces of the bracket 53. Mounted upon the shaft 110 are upwardly extending frame engaging members 120 and 121 which engage abutting portions of the frames 23 and 24, respectively, for moving the frames to the right (Fig. 2) to move the engaging surfaces 103 thereof laterally so that a previously gauged plug may be removed from the apparatus and another plug inserted in the gauging position. During the movement of the frames 23 and 24 of the gauging units 18 and 19 to the right, the gauging plungers 90 of these gauging units are moved to the left. This movement is imparted to the gauging plungers 90 by means of a link and lever connection 125 which operatively connects the shaft 110 with a shaft 126, upon which are mounted plunger moving members 127 and 128 engaging the plungers 90 of the gauging units 18 and 19, respectively. The lower ends of the plunger moving members 127 and 128 engage shoulders provided upon the gauging plungers 90 so that the gauging plungers will be moved to the left (Figs. 1 and 6) when the plunger actuating members are moved in a clockwise direction. The plungers 90 of the gauging units 18 and 19 are positioned to engage the ring 6 and the tip 8 of the plug, respectively.

Another frame engaging member and set of plunger moving members are positioned at the right side of the supporting bracket 53 for bringing about movement of the frame 22 and the gauging plungers 43, 65 and 90 of the gauging units 15, 16 and 17, respectively. The frame engaging member for moving the frame 22 away from the article being gauged is indicated at 135 and is mounted upon a shaft 136, the ends of which are journaled in suitable bearings of upwardly extending portions 137 of the supporting base 10. The shaft 136 is operatively connected to the shaft 110 by a link and lever connection 138, which causes a counterclockwise rotation of the shaft 136 during a clockwise rotation of the shaft 110. A shaft 140 is journaled in suitable bearings in the projections 137 of the support 10 and is operatively connected to the shaft 136 by a link and lever connection 141. Mounted upon the shaft 140 at spaced positions are plunger actuating members 142, 143 and 144, which extend downwardly and have their lower ends positioned in operative association with the gauging plungers 43, 65 and 90 of the gauging units 15, 16 and 17, respectively. The gauging plungers 43 and 65 are positioned to engage spaced portions of the sleeve 5 while the gauging plunger 90 of the gauging unit 17 is positioned to engage the dead collar 7 of the article.

In accordance with an important feature of the present invention, the above described gauging apparatus is provided with an indicating or signaling system for indicating whether or not the measurements of all portions of a plug or other article being gauged are within predetermined limits, said signaling system also serving to indicate whether or not one or more of the gauged portions are oversize if the remaining gauged portions are within predetermined limits. In the event that one of the gauged portions of the plug is undersize, and the remaining gauged portions are either within predetermined limits or oversize, the signaling system indicates the undersize portion. Also, if more than one of the gauged portions of the plug are undersize and the remaining gauged portions are either oversize or within predetermined limits, the signaling system indicates a predetermined one of the undersize portions.

A wiring diagram of the signaling system above referred to is shown in Fig. 7, wherein the gauging units 15 to 19, inclusive, are represented by dotted squares. Briefly, the signaling system comprises a plurality of signaling lamps 150 to 155, inclusive, controlled by a chain of relays 156 to 160, inclusive, which, in turn, are controlled by the circuit controlling members and the associated contacts of the gauging units. By referring to Fig. 7, it is believed that the operation of the signaling system will be clearly understood from the following description of the operation of the apparatus.

To condition the apparatus for receiving a plug or other article to be gauged, the lever 105 is moved downwardly, causing an upward movement of the lifting arm 108 (Figs. 2 and 6), which, in turn, will impart a rocking movement to the rocking lever 109 and a rotative movement to the shaft 110, causing the screw 112 to engage and move the push rod 113, which moves the clamp 55 in a clockwise direction about its pivot 115, away from the horizontal portion 52 of the bracket 53. During the rotation of the shaft 110, the frame engaging members 120 and 121 will engage the frames 23 and 24, respectively, of the gauging units 18 and 19 and move them to the right a predetermined distance. The rotation of the shaft 110 causes a simultaneous rotation of the shaft 126 in a clockwise direction through the link and lever connection 125, causing the plunger moving arms 127 and 128 to be swung in a clockwise direction to move the gauging plungers 90 of the gauging units 18 and 19 to the left a distance equal to that in which the frames 23 and 24 are moved to the right. The rocking of the shaft 110 also imparts a simultaneous rotative movement to the shaft 136 in a counter clockwise direction due to the link and lever connection 138, which movement swings the frame moving member 135 in a counter-clockwise direction, moving the frame 22 of the gauging unit 17 to the left. During the rotation of the shaft 136 in a counterclockwise direction, a similar rotative or rocking movement is imparted to the shaft 140 through the link and lever connection 141, which movement causes the plunger moving members 142, 143 and 144 to be swung in a counterclockwise direction from the position shown in Fig. 6 to move the gauging plungers 43, 65 and 90 of their respective gauging units 15, 16 and 17 to the right (Fig. 6). Therefore, during a downward movement of the lever 105, the clamp 55 is moved out of its clamping position and the frames 22, 23 and 24, as well as all of the gauging plungers 43, 65 and 90, are moved out of their gauging positions so that an article to be gauged, in present instance a plug, may be disposed in place upon the portion 52 of the bracket 53. As soon as the plug is placed upon the portion 52, the lever 105 is released, allowing the spring 116 to draw the clamp 55 into close engagement with the sleeve 5 of the plug, forcing it into abutting relation with the portions 52 and 54 of the bracket 53. The releasing of the lever 105 also allows the springs 44 of the gauging units 15 and 16 to force the gauging plungers 43 into engagement with the respective portions of the sleeve 5 and the springs 91 of the gauging units 17, 18 and 19 to force their respective frames 22, 23 and 24 and gauging plungers 90 into gripping relation with their respective parts, namely, the dead collar 7, the ring 6 and the tip 8.

The movement of the gauging plungers 43 and 65 to the left causes the movable members 32 of the gauging units 15 and 16 to move to the left (Figs. 1 and 3) and in case the portions of the sleeve being gauged are less than the standard minimum measurement required, the circuit controlling members 33 will be moved upwardly due to the pull upon the springs 35 by springs 44, causing the circuit controlling members 33 to engage the resilient contacts 36. If the measurements of the portions of the sleeve 5 are within predetermined limits, the movement of the gauging plungers 43 and 65 will move the movable members 32 to the left until the circuit controlling members 33 have their free ends positioned between and out of engagement with the resilient contacts 36 and 37. If the portions of the sleeve 5 should be larger than the standard maximum measurement required, the gauging plungers 43 and 65 will be limited in their movement to the left (Figs. 1 and 3) allowing the biasing members 95, which are urged by the spring 97, to cause the movable members 32 to remain in the positions, at the right, into which they are moved during the actuation of the lever 105.

The operation of the gauging units 15 and 16 has been described as being the same for each unit but it should be understood that each gauging unit is operated for each portion being gauged and does not depend upon any of the other gauging units to complete an effective gauging operation. Therefore, one portion of the sleeve 5 may be standard in measurement while the other portion may be undersize or oversize and whatever the case may be the associated gauging units will operate accordingly to cause the illumination of the proper signaling lamps.

The operation of the gauging units 17, 18 and 19 is somewhat different than the operation of the gauging units 15 and 16. During the operation of the gauging units 15 and 16, the frames are stationary and the movement of the gauging plungers 43 and 65 relative to the bracket 53 determine the measurements of the sleeve 5, while the frames and the gauging plungers of each of the gauging units 17, 18 and 19 are urged toward each other at the gauging positions by the springs 91 when the lever 105 is released. During the actuation of the lever 105, the frame 22 of the gauging unit 17 is moved to the left upon the supporting pins 71 and 73 and guided in its movement by the guide pin 76, and when the lever is released, the spring 91 simultaneously moves the frame 22 to the right, until the engaging surface 103 of the abutting member 102 thereof engages the left side of the dead collar 7, and the gauging plunger 90 to the left until it engages the right side of the dead collar. This forms a gripping engagement with the frame 22 and the gauging plunger 90 with the dead collar and the relative positions of the engaging surface 103 of the frame and the engaging end of the plunger 90 determine the actuation of the movable member 82 and the circuit controlling member 83. If the gauging surface 103 and the gauging end of the plunger 90 are closer together than the required minimum measurement for the dead collar, the movable member 82 will be moved relative to the stationary member 80 during the relative movement of the plunger 90 and the frame 22, to cause the spring 85 to move the circuit controlling member 83 upwardly into engagement with resilient contact 86. If the measurement of the dead collar is within the required limits, the relative movements of the gauging plunger 90 and the frame 22 will be sufficient to return the movable member to its normal position, as well as the circuit controlling member 83, which will have its free end positioned between and out of engagement with the resilient contacts 86 and 87. If the measurement of the dead collar is greater than the required maximum measurement, the gauging plunger 90 and the frame 22 will be positioned relative to each other to permit the biasing member 95 to be moved about its pivot 96 by the spring 97 to move the movable member 82 to the right and cause the spring 85 to move the circuit controlling member 83 downwardly into engagement with the resilient contacts 87.

The gauging units 18 and 19 operate similarly to the gauging unit 17 to gauge the ring 6 and the tip 8, respectively, of the plug. If each of these portions conform in measurement to the predetermined standards, the circuit controlling members 83 of these units will be positioned out of engagement with their respective resilient contacts 85 and 87. If the measurements of the ring collar and tip portions of the plug being gauged are below the predetermined minimum standards, the circuit controlling members 83 of these units will be moved into engagement with the resilient contacts 86, whereas if these portions are above the predetermined maximum standard, the biasing members 95 to each unit will cause the movable members 82 to be moved to the left to move the circuit controlling members 83 downwardly into engagement with the resilient contacts 87 of each unit. The gauging units 18 and 19 are placed upon the left side of the support 10, whereas the gauging unit 17 is placed upon the right side thereof but the operations of these gauging units are identical.

When all portions of the plug or other article being gauged are within predetermined limits, the circuit controlling members 33 of the gauging units 15 and 16 and the circuit controlling members 83 of the gauging units 17, 18 and 19 are positioned between their respective resilient contacts but not in engagement therewith, as shown in Fig. 7. When this condition prevails, an electrical circuit is established as follows: from a grounded battery 172, through a switch 173, which may be manually or automatically closed when the plug to be gauged is placed in the apparatus, through armature 174 and contact 175 of relay 156, armature 176 and contact 177 of relay 157, armature 178 and contact 179 of relay 158, armature 180 and contact 181 of relay 159 and armature 182 and contact 183 of relay 160 to ground lamp 155. The completion of this circuit causes the illumination of lamp 155 which indicates to the operator that all portions of the plug being gauged are within predetermined permissible limits.

When the circuit controlling members 33 of the gauging units 15 and 16, and the circuit controlling members 83 of the gauging units 17, 18 and 19 are positioned between and out of engagement with their respective contacts, a circuit is completed from the grounded battery 172 through the switch 173, which is automatically closed when the article is placed in the apparatus through the armature 174 of the relay 156, the contact 175, the armature 176 of the relay 157, the contact 177, the armature 178 of the relay 158, the contact 179, the armature 180 of the relay 159, the contact 181, the armature 182 of the relay 160, the contact 183, through the standard signaling lamp 155 to ground.

If all of the portions being gauged are within the required limits, with the exception of one, for example, the dead collar 7, and the dead collar is oversize sufficiently to cause the circuit controlling member 83 of the gauging unit 17 to engage the contact 87 thereof, a circuit will be completed from the grounded battery 172 through switch 173, armature 174 and contact 175 of relay 156, armature 176 and contact 177 of relay 157, armature 178 and contact 179 of relay 158, armature 180 and contact 181 of relay 159, through the winding of relay 160, and through the contact 87, and the grounded circuit controlling member 83 of the gauging unit 17. The completion of this circuit energizes the relay 160, moving its armature 182 free of its contact 183 to break the circuit through the signaling lamp 155, the energization of the relay 160 simultaneously moving armature 184 thereof into engagement with contact 185 completing a circuit through the series of relay armatures and contacts previously described from the grounded battery 172 through the signaling lamp 154. A similar circuit is closed for energizing the relay 160, which simultaneously breaks the circuit through the signaling lamp 155 and completes the circuit through the signaling lamp 154 when any number of the portions of the plug being gauged are oversize, providing the other portions are of standard measurements.

If any one of the portions of the plug should be undersize, even though the other portions are within the required limits, one of the signaling lamps 150 to 153, inclusive, relating to that certain portion will be illuminated and the above described circuit through the signaling lamp 155 will be opened. For example, let it be assumed that the tip 8 is undersize and that all of the other portions of the plug being gauged are within the required limits. In this instance, the circuit controlling members 33 of the gauging units 15 and 16, and the circuit controlling members 83 of the gauging units 17 and 18 will be positioned out of engagement with their respective contacts, whereas the circuit controlling member 83 of the gauging unit 19 will be moved into engagement with the contact 86 thereof, completing a circuit from the grounded battery 172 through the switch 173, armature 174 and contact 175 of relay 156, armature 176 and contact 177 of relay 157, armature 178 and contact 179 of relay 158, the winding of relay 159 and through the contact 86 and the grounded circuit controlling member of gauging unit 19. The completion of this circuit energizes the relay 159 which simultaneously moves its armature 180 out of engagement with its contact 181 to open the circuit through the signaling lamp 155, and moves an armature 186 into engagement with a contact 187 thereof, thus completing a circuit from the grounded battery 172 through the closed relay contacts 175, 177, 179 and 187 and the grounded signaling lamp 153.

The above described circuit arrangement is such that when more than one portion of the plug being gauged are undersize, the signaling lamps 150, 151, 152, and 153 are selectively illuminated to indicate a predetermined one of the undersize portions. For example, let it be assumed that the ring 6 and the tip 8 are both undersize and that the sleeve 5 and the dead collar 7 conform to the standard measurements. Even though the circuit controlling members 83 of both of the gauging units 18 and 19 are moved into engagement with their respective contacts 86, the engagement of the circuit controlling member 83 with the contact 86 of the gauging unit 19 will not complete a circuit through the winding of relay 159 to complete a circuit through the signaling lamp 153 for the reason that the engagement of the circuit controlling member 83 with the contact 86 of the gauging unit 18 will complete a circuit through the winding of relay 157, the energization of which will break the chain of contacts leading to the winding of relay 159 by moving armature 176 away from contact 177. The energization of the relay 157 will move armature 190 into engagement with the contact 191 thereof, thus completing a circuit from the grounded battery 172 through the switch 173, armature 174 and contact 175 of relay 156, armature 190 and contact 191 of relay 157 through the grounded signaling lamp 151. In a similar manner in the event that sleeve 5 and the dead collar 7 are both undersize while the ring 6 and the tip 8 conform to standard measurements, either or both of the circuit controlling members 33 of the gauging units 15 and 16 are moved into engagement with their respective contacts 36 and the circuit controlling member 83 of the gauging unit 17 is moved into engagement with its associated contact 86. However, the engagement of the circuit controlling member 83 with the contact 86 of the gauging unit 17 will not complete a circuit through the winding of relay 158 to thereby cause the engagement of armature 192 with contact 193 thereof to complete a circuit through grounded signaling lamp 152, for the reason that the engagement of one or both of the circuit controlling members 33 of gauging units 15 and 16 will complete a circuit through the winding of relay 156, the energization of which will break the chain of contacts leading to the winding of relay 158 by moving the armature 174 away from the contact 175. The energization of the relay 156 will move armature 194 into engagement with contact 195 thereof, thus completing a circuit from the grounded battery 172 through the switch 173, armature 194 and contact 195 of relay 156, and grounded signaling lamp 150.

The plugs which have been indicated as having certain of their portions oversize and their other portions standard in measurement, by the illumination of the signaling lamp 154 during the gauging operations of each plug, are placed in a container and later profiled. It is not necessary to indicate the particular portion or portions of the plug which are oversize for the reason that the profiling machine is arranged to profile all of the portions to standard measurements and those portions which need to be profiled will be and the others will not. However, it is advantageous to indicate the undersize portion if there is only one or a predetermined one of the undersize portions, if there are more than one, for the reason that plugs having one or more undersize portions can be corrected only by replacing the undersize portions. Since the number of portions that must be removed from the plug in order to replace an undersize portion depends upon the position of the undersize portion with respect to the tip portion of the plug, it is obviously advantageous to indicate the undersize portion farthest removed from the tip portion, when more than one of the gauged portions are undersize, so that it may be readily determined if the undersize portion can be economically replaced.

The purpose of moving the gauging plungers and the movable frames to permit the insertion of a plug to be gauged in the apparatus is to eliminate wear upon these portions which would result if the plug were forced in place, depending upon the plug itself to move the gauging plungers and the movable frames. The elimination of wear upon these portions makes it possible to accurately gauge a multiplicity of articles without frequently adjusting the apparatus to take up wear. Furthermore, with this apparatus the portions may be gauged accurately even though the several portions may not be properly aligned with respect to each other.

It should be understood that even though this embodiment of the invention is designed especially to gauge a plurality of portions of a terminal plug, other modifications may be adopted for gauging a plurality of portions of other articles without departing from the spirit and scope of the present invention.

What is claimed is:

1. In a gauging apparatus, a plurality of gauging elements, a contact operated by each of said elements respectively, a relay controlled by each of said contacts respectively, a plurality of indicating devices and means for conjointly controlling said indicating devices including said contacts and relays.

2. In a gauging apparatus, means for gauging a plurality of portions of an article, and means effective when more than one of the gauged portions are dimensionally defective for selectively indicating a predetermined one of the defective portions.

3. In a gauging apparatus, means for gauging a plurality of portions of an article, means for indicating when all of the gauged portions are within predetermined limits, and means effective when more than one of the gauged portions are dimensionally defective for selectively indicating a predetermined one of the defective portions.

4. In a gauging apparatus, means for gauging a plurality of portions of an article, means for indicating when the portions being gauged are within predetermined limits, and means for rendering said indicating means ineffective when one of the portions being gauged is not within predetermined limits, and means cooperating with the last mentioned means for indicating said portion.

5. In a multiple gauge system, a plurality of article engaging elements movable in response to the dimensions of portions of an article being gauged, an indicating member for each element, and means for selectively energizing one of said indicating members even though more than one of said elements are actuated by dimensionally defective portions of the article.

6. In a multiple gauge system, a plurality of article engaging elements movable in response to the dimensions of portions of an article being gauged, an indicating member common to all of said elements, an indicating member for each element, means for energizing the first mentioned indicating member when all of the portions being gauged are within predetermined limits, and means for selectively energizing one of the other indicating members when one or more of said elements is actuated by a dimensionally defective portion of the article and for simultaneously rendering said first mentioned indicating member ineffective.

7. In a multiple gauge system, a plurality of article engaging elements movable in response to the dimensions of portions of an article being gauged, a chain of relays, an indicating member for each portion being gauged, and means for selectively energizing certain of the relays when certain of said elements are moved by one or more dimensionally defective portions for causing energization of a predetermined one of the indicating members.

8. In a multiple gauge system, a plurality of article engaging elements movable in response to the dimensions of portions of an article being gauged, a standard indicating member, a plurality of indicating members, means for energizing one of said indicating members when all of the portions of the article being gauged are within predetermined limits, means for energizing another of said indicating members and simultaneously rendering the first mentioned indicating member ineffective when certain portions of the article being gauged are not within predetermined limits, and means controlled by said article engaging elements for controlling said energizing means.

9. In a gauging apparatus, a plurality of gauging plungers, a plurality of abutting members disposed opposite said gauging plungers, means for simultaneously moving said gauging plungers and said abutting members so that an article may be disposed in gauging position, means for moving said gauging plungers and said abutting members toward and into engagement with predetermined portions of the article, and means responsive to the relative movements of said gauging plungers and their respective abutting members for indicating the measurements of the portions.

10. In a gauging apparatus, a plurality of gauging plungers, a plurality of abutting members disposed opposite said gauging plungers, means for simultaneously moving said gauging plungers and said abutting members so that an article may be disposed in gauging position, means for moving said gauging plungers and said abutting members toward and into engagement with predetermined portions of the article, and means controlled by the relative movements of said gauging plungers and their respective abutting members for selectively indicating the measurements of the portions of the article.

11. In a gauging apparatus, a plurality of gauging units movable relative to each other for simultaneously gauging a plurality of portions of an article, and relatively movable article engaging elements included in each of said gauging units.

12. In a gauging apparatus, a plurality of gauging units having relatively movable article engaging elements for simultaneously gauging a plurality of portions of an article, a plurality of signaling devices, and a plurality of relays selectively controlled by the article engagement elements for selectively actuating said signaling devices according to the dimensions of the portions of the article being gauged.

13. In a gauging apparatus, a plurality of gauging elements for simultaneously gauging a plurality of portions of an article, a separate contact controlled by each gauging element, an indicating device controlled by said contacts, conjointly, for indicating when all the gauged portions of the article are within predetermined limits, and a second indicating device controlled by said contacts, severally, for indicating when any of the gauged portions are oversize if the remaining gauged portions are within predetermined limits.

14. In a gauging apparatus, a plurality of gauging elements for simultaneously gauging a plurality of portions of an article, a separate pair of contacts controlled by each gauging element, an indicating device controlled by said contacts, conjointly, for indicating when all the gauged portions of the article are within predetermined limits, a second indicating device controlled by one contact of each pair, severally, for indicating when any of the gauged portions are oversize if the remaining portions are within predetermined limits, and means controlled by the other contact of each pair for selectively indicating undersize portions of the article, said last mentioned means being effective when more than one of the gauged portions are undersize, for indicating a predetermined one of the undersized portions.

15. In a gauging apparatus, a plurality of gauging elements movable responsive to portions of an article being gauged, contacts operated by the gauging elements, a plurality of indicating devices, and a chain of relays controlled by said contacts for controlling said indicating devices and having sets of relay contacts, one set of said relay contacts being normally closed and the other set being normally opened whereby the closing of the contacts by certain of the portions of the article, if dimensionally defective, will selectively energize one of said relays to move one of its contacts into closed position to energize one of said indicating devices and to move its other contact into open position.

16. In a gauging apparatus, a plurality of gauging elements movable responsive to portions of an article being gauged, contacts operated by said gauging elements, a plurality of indicating devices, and a chain of relays controlled by said contacts for controlling said indicating devices and having sets of relay contacts, one set of relay contacts being normally closed to energize one of said indicating devices when the portions being gauged are within predetermined limits and said relays and relay contacts being arranged so that a selective one of said indicating devices may be energized when more than one of the gauged portions are dimensionally defective.

17. In a gauging apparatus, means for gauging a plurality of separable parts of an article, and means effective when a predetermined plurality of the gauged parts are dimensionally defective for selectively indicating a predetermined one of the defective parts.

18. In a gauging apparatus, means for gauging a plurality of separable parts of an article, certain of the parts differing in cross-sectional area, and means effective when more than one of the gauged parts are dimensionally defective for selectively indicating a predetermined one of the defective parts.

19. In a gauging apparatus, means for gauging a plurality of separable parts of an article, means for clamping one of the parts for holding the article against movement, and means effective when more than one of the gauged parts are dimensionally defective for selectively indicating a predetermined one of the defective parts.

20. In a gauging apparatus, means for clamping one of a plurality of parts of an article, means for gauging the clamped part, means including diametrically opposed gripping elements for gauging each of the other parts, means responsive to said gauging means and including an indicating device for indicating when said parts are within predetermined limits, and means for rendering said indicating device ineffective when one or more of the parts are defective.

21. In a gauging apparatus for gauging an article, a pair of fixed gauging elements, a pair of movable gauging elements cooperating therewith for measuring two dimensions of an article, and a pair of cooperating gauging elements for measuring a third dimension of an article movable relative to the article and to each other.

22. In a gauging apparatus for gauging an article, a frame having a fixed gauging element, a movable gauging element cooperating therewith for measuring a dimension of an article, and a pair of gauging elements movable relative to said frame and to each other for gauging another dimension of said article.

23. In a gauging apparatus for gauging at least three dimensions of an article, means for holding an article in fixed position and measuring two of said dimensions, and means movable relative to said fixed position of the article for measuring another dimension.

NORBERT K. ENGST.
ARTHUR W. SCHOOF.